INVENTORS
GEORGE C. BROWN
DANIEL M. KLANG
BY FREDERICK G. MORITZ
ATTORNEY

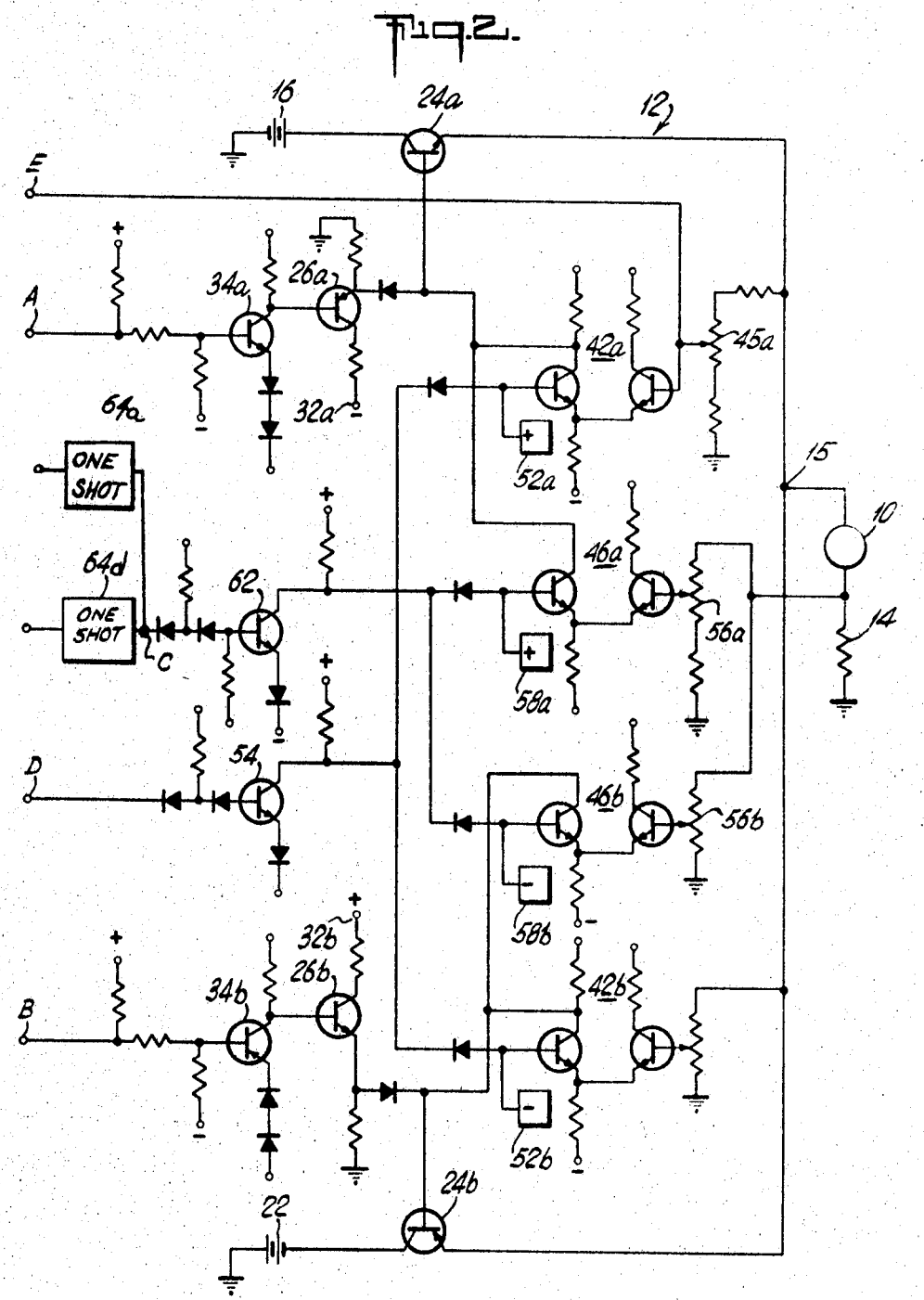

United States Patent Office 3,471,073
Patented Oct. 7, 1969

3,471,073
CAPSTAN MOTOR POWER SUPPLY
George C. Brown, Syosset, Daniel M. Klang, Huntington Station, and Frederick G. Moritz, Hauppauge, N.Y., assignors to Potter Instrument Company, Inc., Plainview, N.Y., a corporation of New York
Filed June 6, 1967, Ser. No. 643,994
Int. Cl. B65h 17/20; H02p 5/28
U.S. Cl. 226—188                  7 Claims

ABSTRACT OF THE DISCLOSURE

In this single capstan magnetic tape transport, the capstan is directly driven by a low inertia D.C. motor; a constant current for a predetermined interval is applied in starting and stopping the motor, and a constant voltage is applied to run the motor at a constant speed.

BACKGROUND OF THE INVENTION

This invention relates to a single capstan magnetic tape transport of the type in which the capstan is directly driven by a low inertia motor and, more particularly, to an open loop system for controlling the starting, stopping, running speed, and direction of rotation of the capstan drive motor.

Closed loop servo systems have been proposed in the prior art for controlling the starting, stopping, and running speed of a low inertia capstan drive motor; one such system is disclosed in U.S. Patent No. 2,708,554 issued to Welsh et al. Although such prior art systems are generally satisfactory in operation, they employ a tachometer or other similar device for sensing the speed of the motor, thus making these systems relatively complex and expensive.

One object of this invention is to provide an open loop system for controlling the starting, stopping and running speed of a low inertia motor which directly drives the capstan of a single capstan transport.

Another object of the invention is the provision of such a system which is simple, reliable and relatively inexpensive.

SUMMARY OF THE INVENTION

Briefly, this invention contemplates the provision of a capstan control system that provides a constant current for a fixed interval in starting and stopping the motor and a constant voltage for running the motor. An adjunct of the invention is that the magnitude of the constant voltage output is selectable to the end that the speed of the motor may be varied.

Having briefly described this invention, it will be described in greater detail along with other objects and advantages in the following detailed description of a preferred embodiment which may be best understood by reference in the accompanying drawings which form part of the instant specification and which are to be read in conjunction therewith and which like reference numerals are used to indicate like parts in the various views.

BRIEF DESCRIPTION OF THE DRAWINGS

FIGURE 2 is a schematic diagram of an embodiment of an open loop system for energizing and controlling the capstan drive motor.

DESCRIPTION OF THE PREFERRED EMBODIMENTS

Figure 1:
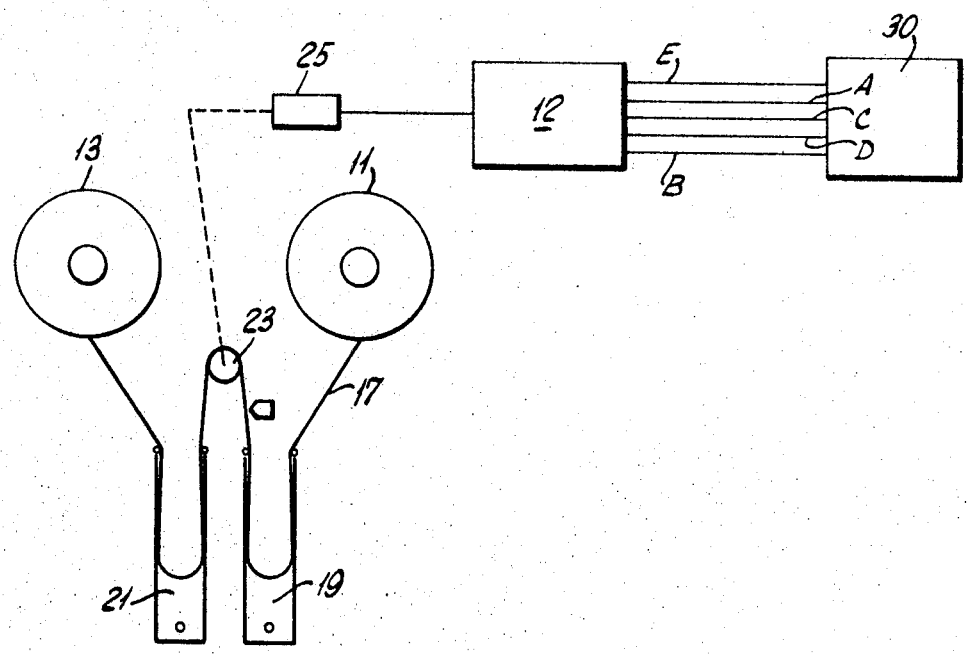
FIGURE 1 is a block diagram of a single capstan transport having an open loop capstan control system of this invention.

Referring now to FIGURE 1 of the drawings, a magnetic tape transport of the invention has a file reel 11 and a machine reel 13 between which a magnetic tape 17 extends. A pair of vacuum buffer columns 19 and 21 serve to hold the tape 17 in frictional engagement with a centrally disposed capstan 23 and to form buffering loops in the tape. Sensors (not shown) in the vacuum columns 19 and 21 control the rotation of reels 11 and 13 in a suitable manner well known to those skilled in the art. A low inertia D.C. motor 25 is directly coupled to the capstan 23 and this motor is energized by a power supply system 12 whose output controls the starting, stopping and running speed of the D.C. motor 25. Signals from a computer or other suitable controller 30 select one of several outputs of power supply 12.

Referring now to FIGURE 2 of the drawings wherein the capstan power system 12 is shown in detail, one terminal of the armature 10 of the low inertia D.C. motor 25 is coupled to the output terminal 15 of power supply 12; a current sensing resistor 14 couples the other armature terminal to ground. The motor field may be provided by a permanent magnet (not shown), for example.

For energizing the motor armature 10, there are two potential sources; a positive source 16 and a negative source 22. These sources 16 and 22 are coupled to the terminal 15 via series regulating transistors 24a and 24b, respectively. A positive potential at terminal 15, for example, produces clockwise rotation of the armature 10, and a negative potential, counterclockwise rotation. It should be noted that while a single regulating transistor has been shown for the positive supply and a single transistor for the negative supply, a number of regulating transistors may be used in parallel, if desired.

The power supply 12 has input terminals designated E, A, D, C and B. Suitable potential levels from the controller 30 on terminals A and B select, respectively, clockwise or counterclockwise rotation of the capstan. A potential level on terminal C commands both the starting and the stopping of the armature 10. A level on terminal D is the running command. An input at terminal E commands a change in speed of the rotating capstan.

In the embodiment of the invention of FIGURE 2, normally conducting transistor switches 26a and 26b clamp the base of regulating transistors 24a and 24b to bias potentials at 32a and 32b, which bias the transistors 24a and 24b off and thereby decouple the terminal 15 from the potential sources 22 and 16. In selecting clockwise rotation of the armature 10, for example, a suitable logic or voltage level is coupled to terminal A, amplified and inverted by transistors 34a and coupled to the base of transistor 26a, biasing it to cut off, unclamping regulator transistor 24a. Counterclockwise rotation is selected in a similar manner by a suitable level at terminal B.

A pair of difference amplifiers 42a and 46a control the current flow through transistors 24a during running and starting or stopping, respectively, when this transistor is unclamped. Similarly, a pair of difference amplifiers 42b and 46b control the current through transistor 24b during running and starting or stopping, respectively, when this transistor is unclamped.

Amplifiers 42a and 42b compare the voltage across the armature 10 to reference potentials 52a and 52b. Their output, which is a function of the difference between the voltage across the armature 10 and the references 52a and 52b, maintains constant the voltage across the armature 10; it should be noted that with a constant armature voltage, the motor will rotate at a constant speed as long as its load also remains constant.

In a similar manner, difference amplifiers 46a and 46b provide an output signal which is a function of the current flow through the armature 10. One input to each amplifier is coupled between the armature 10 and resistor 14 via potentiometers 56a and 56b, respectively, and the other input terminal to each is coupled to reference potentials 58a and 58b. Difference amplifiers 46a and 46b serve to keep constant the current flow through armature 10 during starting and stopping, thereby providing a linear acceleration and deceleration of the motor armature.

A normally conducting transistor switch 54 clamps the reference side of amplifiers 42a and 42b to a negative potential, turning off these difference amplifiers. An input at terminals D cuts off transistor 54, unclamping amplifiers 42a and 42b.

Similarly, a normally conducting transistor switch 62 clamps the reference side of amplifiers 46a and 46b to a negative potential, turning off these amplifiers. A signal at terminal C from timing circuits 64a and 64d, respectively, cut off transistor 62 for a predetermined interval during starting and stopping the motor armature 10. The output pulse width of one shots 64a and 64d may be adjusted to the end that the capstan reaches desired speed at the termination of the output pulse of one shot 64a and that the capstan is at rest at the termination of the output pulse from one shot 64d. Usually the duration of the stopping interval is about ten (10) percent less than the duration of the starting interval.

A signal of appropriate magnitude may be applied at terminal E in order to increase or decrease the speed of the motor during its clockwise rotation. A potential at terminal E biases the input to amplifiers 42a and thereby varies the amplifier output for a given armature potential. If desired, a similar terminal (not shown) may be provided for amplifier 42b in order to increase or decrease the counterclockwise rotational speed of the motor armature.

In operation, in order to start the armature rotating in a clockwise direction from its rest position, for example, an input signal is applied at terminals A and C; the input at terminal A unclamps regulator transistor 24a, and the input at terminal C trigger circuit 64, which cuts off transistor switch 62 for a certain interval and unclamps difference amplifier 46a. It should be noted that although amplifier 46b is also unclamped, its output has no effect on the operation of the motor since series regulator transistor 24b is clamped to a fixed potential, cutting it off. During this starting interval, amplifiers 42a and 42b are also clamped to a fixed reference potential, cutting them off.

Figure 3:
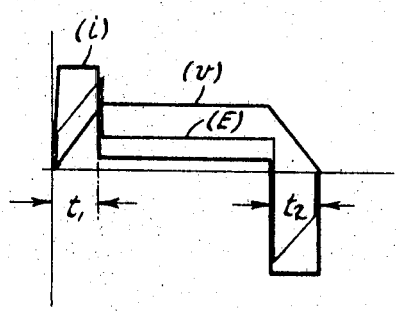
FIGURE 3 is a timing diagram showing various system parameters as a function of time.

Referring now to FIGURE 3 in addition to FIGURE 2, the armature current $i$ rises rapidly to a value established by the setting of potentiometer 56a and the reference potential 58a; thereafter, it remains constant for an interval $t_1$, established by the timing circuit 64. This constant current produces a constant acceleration (with a constant load), and the velocity ($v$) increases linearly during this interval $t_1$.

At the end of the interval $t_1$, an input is applied at terminal D from controller 30 which cuts off transistor 54, unclamping differential amplifier 42a. The output of amplifier 42a thereafter controls the flow of current through transistor 24a to the end that the potential across the armature 10 is maintained constant at a level established by the potentiometer 45a and the reference potential 52a. The constant potential (E) maintains the rotational speed of the armature 10 constant under constant load conditions. It should be noted that during the constant current starting interval, the potential (E) across the motor increases owing to the increasing back electromotive force (EMF) of the motor.

Similarly, during stopping, this potential decreases as the back EMF of the motor decreases.

The signals at terminals A and D terminate in stopping the armature 10, and signals are simultaneously applied at terminals B and C. The signal at terminal B unclamps series regulator transistor 24b and the signal at terminal C is provided by timing circuit 64d. The difference amplifier 46b controls transistor 24b to the end that the current flow through armature 10 is increased rapidly to the same value as in starting the armature 10, but of opposite polarity. This current is maintained constant for an interval $t_2$ as in starting; the armature decelerates at a constant rate during this interval, causing a linear decrease in the velocity. At the end of the deceleration interval, the armature is at rest.

As the circuits for producing counterclockwise rotation of the armature 10 are substantially the same as those for clockwise rotation, an additional description of that operation is believed unwarranted.

Thus, it will be appreciated that the objects of the invention have been accomplished. It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific details shown and described.

What is claimed is:

1. In a magnetic tape transport, the combination comprising:
   a capstan,
   a D.C. motor having a low inertia armature directly coupled to said capstan,
   first means responsive to a first input signal for energizing said motor with current of one polarity for rotating said armature at a constant predetermined speed,
   second means responsive to a second input signal for energizing said motor with a constant current of said one polarity and of a first predetermined magnitude for a first predetermined interval, said first predetermined magnitude and said first predetermined interval being selected so that said motor accelerates to said constant predetermined speed at the end of said first predetermined interval, and
   third means responsive to a third input signal for energizing said motor with a constant current of opposite polarity and a second predetermined magnitude for a second predetermined interval, said second predetermined magnitude and said predetermined interval being selected so that said motor decelerates to rest at the end of said second predetermined interval.

2. A magnetic tape transport as in claim 1 wherein said predetermined interval for starting said motor is longer than said predetermined interval for stopping said motor.

3. In a magnetic transport, the combination comprising:
   a capstan,
   a D.C. motor having a low inertia armature directly coupled to said capstan,
   first means responsive to the first input signal for energizing said motor with current of one polarity for rotating said armature at a constant speed, second means responsive to a second input signal for energizing said armature with a constant current of one polarity for a predetermined interval to start said motor, and third means responsive to a third input signal for energizing said armature with a constant current of the opposite polarity for a predetermined interval to stop said motor, said second and third responsive means including means for comparing the current flow through said armature with a reference signal.

4. A magnetic tape transport as in claim 3 wherein said comparing means includes a first difference amplifier means.

5. A magnetic tape transport as in claim 4 wherein said first responsive means includes means for comparing the voltage across said armature with a reference signal.

6. A magnetic tape transport as in claim 5 wherein said means for comparing the voltage across said armature includes a second difference amplifier means.

7. A magnetic tape transport as in claim 6 further including means for biasing said second difference amplifier in order to change the rotational speed of said armature.

References Cited

UNITED STATES PATENTS

| 3,251,563 | 5/1966 | Kleist et al. | 226—188 X |
| 3,293,522 | 12/1966 | Lewis | 318—257 X |
| 3,326,440 | 6/1967 | Barnes et al. | 226—188 |

OTHER REFERENCES

Scalone, "Reversible Motor Control"; IBM Technical Disclosure Bulletin, vol. 5, No. 12, May 1963.

ALLEN N. KNOWLES, Primary Examiner

U.S. Cl. X.R.

318—260; 226—49